(12) United States Patent
Hatanaka (10) Patent No.: US 7,834,908 B2
(45) Date of Patent: Nov. 16, 2010

(54) IMAGING DEVICE

(75) Inventor: Haruo Hatanaka, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 902 days.

(21) Appl. No.: 11/727,731

(22) Filed: Mar. 28, 2007

(65) Prior Publication Data

US 2007/0230938 A1 Oct. 4, 2007

(30) Foreign Application Priority Data

Mar. 29, 2006 (JP) ............................. 2006-091285

(51) Int. Cl.
*H04N 5/228* (2006.01)
(52) U.S. Cl. .................................. 348/208.4
(58) Field of Classification Search ... 348/208.4–208.6, 348/208.12
See application file for complete search history.

(56) References Cited

U.S. PATENT DOCUMENTS 7,664,382 B2 * 2/2010 Yamasaki .................... 396/55
7,675,546 B2 * 3/2010 Usui ........................ 348/208.5
2002/0163581 A1 * 11/2002 Kitazawa et al. ......... 348/208.6
2009/0046161 A1 * 2/2009 Steinberg et al. ......... 348/208.6

FOREIGN PATENT DOCUMENTS

JP 9-261526 A 10/1997
JP 2004-221992 A 8/2004

* cited by examiner

*Primary Examiner*—Tuan Ho
(74) *Attorney, Agent, or Firm*—NDQ&M Watchstone LLP (57) ABSTRACT

An imaging device is provided that predicts before still image photographing, whether alignment of a plurality of images obtained by the still image photographing mode should be performed based on the divided exposures and automatically switches photographing modes depending on the predicted result. The imaging device has a first movement computation unit that calculates image movement from input images when still image photograph is not performed, and a photographing mode switching unit that switches between a first still image photographing mode and a second still image photographing mode when starting photographing, based on image movement calculated by the first movement computation unit right before the photographing begins.

16 Claims, 8 Drawing Sheets

FIG. 1

RELATED ART

IMAGING DEVICE

CROSS REFERENCE TO RELATED APPLICATIONS

This application claims priority based on 35 USC 119 to Japanese Patent Application No. P2006-091285 filed on Mar. 29, 2006, the entire contents of which are incorporated herein by reference.

BACKGROUND OF THE INVENTION

1. Field of the Invention

The invention relates to an imaging device and in particular, to an imaging device capable of switching between a photographing mode by a first still image photographing part and a photographing mode by a second still image photographing part.

2. Description of Related Art

Camera-shake correction technology of still images is a technology to alleviate blurring of images due to hand movement when still images are taken. This is achieved by an element that detects camera shake and an element that corrects an image based on the detected result.

In a method for detecting camera shake, a method uses a camera shake sensor (angular rate sensor) and a method electronically detects camera shake by an image analysis. As a method for correcting images, there are a optical type camera-shake correction that corrects images by an optical operation and an electronic type camera-shake correction that corrects an image by image processing.

As to a still-image camera shake correction, there are a method that detects camera shake by a sensor and optically corrects the camera shake based on the detected result, a method that detects camera shake by a sensor and electronically corrects the camera shake based on the detected result, and a method that electronically corrects camera shake by image processing.

Figure 1:
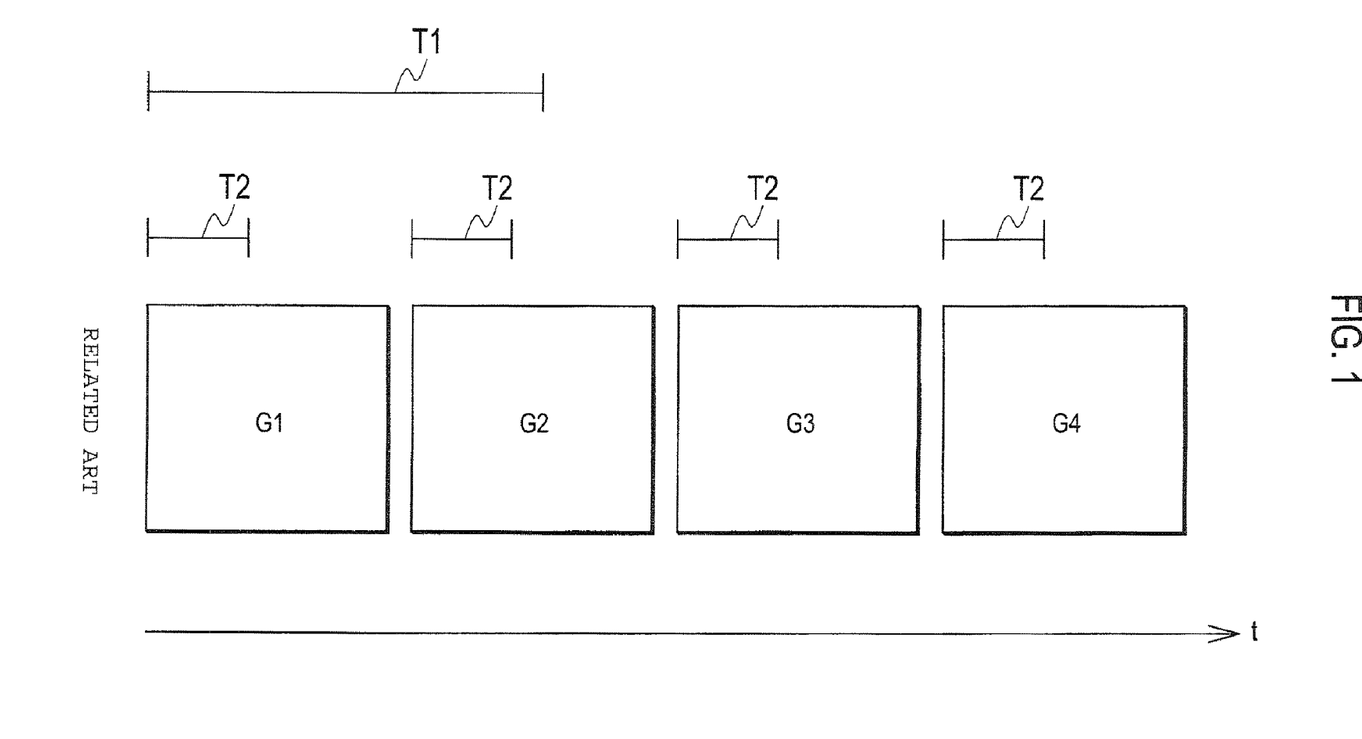
FIG. 1 is a schematic view for explaining a conventional full electronic type camera shake correction system.

The method that electronically corrects camera shake based on the camera shake detection result by image analysis is called a full electronic camera shake correction. As a full electronic camera shake correction system that is put to practical use, there is a system in which a plurality of short time exposure images (divided images) G1 to G4, each of which having its exposure time T2 obtained by dividing normal exposure time T1, are aligned and combined according to their image characteristics, thus producing a still image G (an image addition type camera shake correction), as shown in FIG. 1.

In the image addition type camera shake correction, if each divided image fully coincides with each other by an alignment, the amount of camera shake is reduced to an exposure time of one divided image. However, in the image addition type camera shake correction, the period of time from the beginning of exposure for the first short time exposure image G1 to the end of exposure for the last short time exposure image G4 may become longer than a normal exposure, and thus, there is a drawback that the degree of camera shake of the photographic subject during that time period may be larger. Moreover, if the alignment by the image processing fails, the camera shake may become larger than a normal exposure, unfortunately.

Japanese Laid Open No. 9-261526 describes an imaging device that takes pictures serially with an exposure time that does not cause camera shake under a low brightness condition, and combines a group of such underexposed images after correcting mutual misalignment among the plurality of images, to obtain an appropriate image without blurring.

Japanese Laid Open No. 2004-221992 describes an imaging device and program in which the imaging device has a control means that sets up one of a first photographing mode and a second photographing mode depending on the conditions at the time of photographing, such as brightness of the photographic subject, focusing length, aperture, and photographic sensitivity, in which the first photographing mode obtains a combined image that is exposure-adjusted by combining a plurality of images taken in series, and the second photographing mode obtains an image that corresponds to the combined image by one shooting.

One purpose of the invention is to provide an imaging device having a still image photographing mode based on a one-shot exposure and a still image photographing mode based on divided exposures, in which the imaging device makes a prediction before still image photographing is started as to whether an alignment of a plurality of images obtained by the still image photographing mode based on the divided exposures is normally performed, and automatically switches the photographing modes depending on the predicted result.

Another purpose of the invention is to provide an imaging device that makes a prediction of whether an alignment of the remaining images is normally performed during still image photographing based on divided exposures, and automatically determines whether to continue the divided exposures or to perform a one-shot exposure of the remaining part depending on the predicted result.

SUMMARY OF THE INVENTION

One aspect of the imaging device according to the embodiment includes a first still image photographing unit that obtains a still image by one exposure; a second still image photographing unit that generates a still image by dividing an exposure length a plurality of times to obtain a plurality of low brightness images, and aligning and combining the obtained plurality of low brightness images; a first movement computation unit that calculates image movement from input images when still image photographing is not performed; and a photographing mode switching unit that switches between the first still image photographing unit and the second still image photographing unit when commencing still image photographing, from information of the calculated image movement prior to making a still image photograph.

Another aspect of the imaging device according to the embodiment has a still image photographing unit that generates a still image by dividing an exposure length to obtain a plurality of low-brightness images, and aligning and combining the obtained low-brightness images, in which the still image photographing unit includes: a movement computation unit that calculates image movement between an obtained second or later low-brightness image and the first low-brightness image when obtaining the second or later low-brightness image; a judgment unit that determines whether to continue the divided exposures or to perform a one-shot exposure of the remaining low-brightness images from information of image movement calculated by the movement information computation unit; an image obtaining unit that obtains an image corresponding to the remaining low-brightness images by performing the one-shot exposure of the remaining low-brightness images if the one-shot exposure of the remaining low-brightness images is selected; and an image synthesis unit that generates a still image by aligning and combining an obtained image that corresponds to the remaining low-brightness images to the previously combined image.

DETAILED DESCRIPTION OF EMBODIMENTS

Embodiments of the invention as exemplified for a digital camera will be described with reference to the accompanying drawings below.

Example 1

[1] Explanation of a Digital Camera Structure

Figure 2:
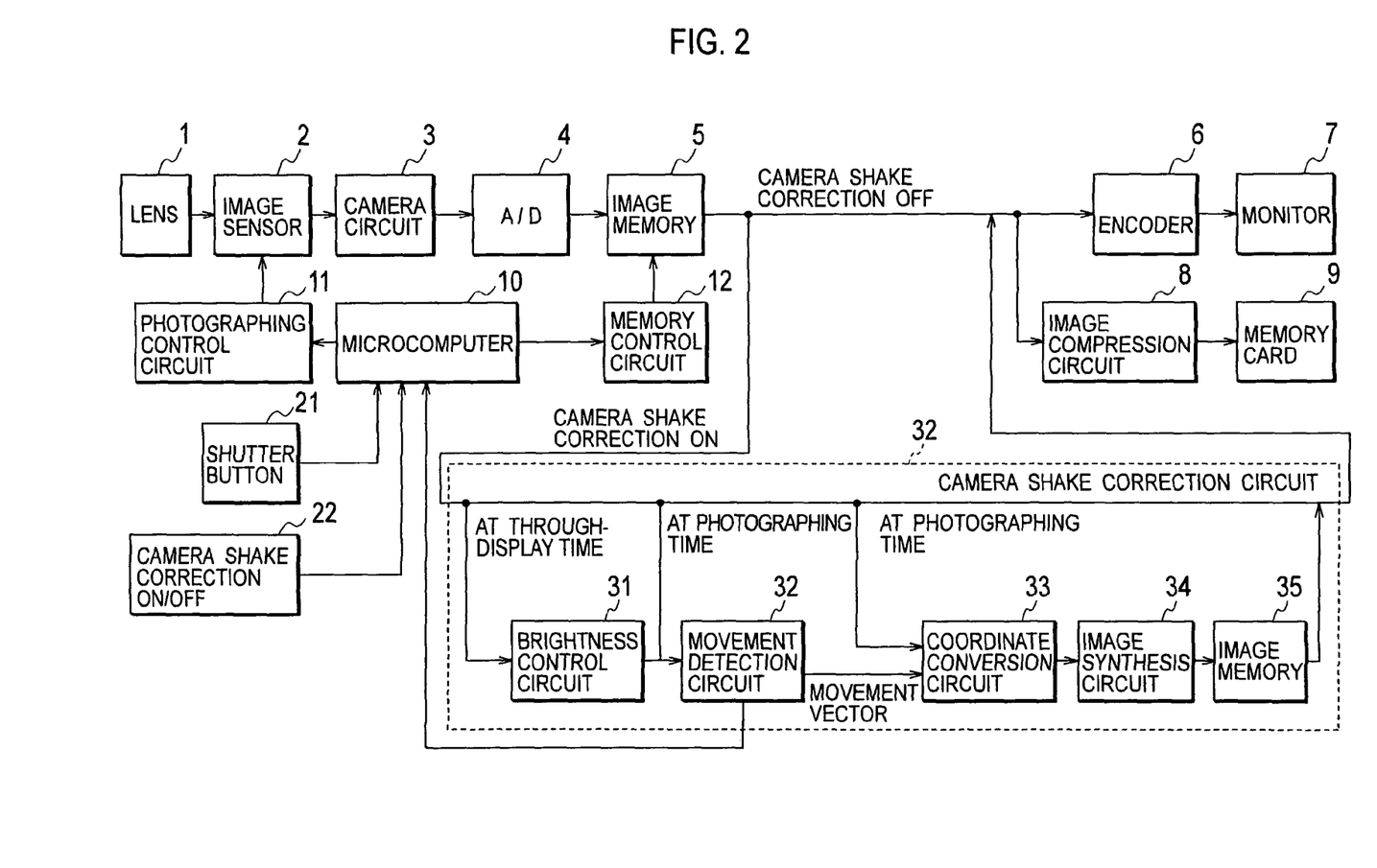
FIG. 2 is a block diagram showing a structure of a digital camera according to one embodiment of the invention.

FIG. 2 describes a digital camera structure. Image sensor (CCD) 2 photo-electrically converts an optical image entered through lens 1 and outputs the image as electrical signals. The output signals (RGB signals) from image sensor 2 are transmitted to camera circuit 3 having a CDS circuit and an AGC circuit. The output signals of image sensor 2 that are inputted to camera circuit 3 are processed for correlated-double-sampling and then gain controlled to appropriate amplitudes by the AGC circuit. The output signals of camera circuit 3 are converted to digital image signals by A/D converter 4. The digital image signals are written into image memory 5. Photographing control circuit 11 sets an optimal exposure time of image sensor 2 based on brightness information obtained at a photometry circuit that measures brightness of a photographic subject.

Image memory 5 is controlled by microcomputer 10 through memory control circuit 12. Image control circuit 11 is also controlled by microcomputer 10. Shutter button 21 and camera shake correction ON/OFF switch 22 are connected to microcomputer 10. The camera shake correction photographing mode and normal photographing mode are set by camera shake correction ON/OFF switch 22. Operations will be explained by dividing into the cases in which the camera is set in the normal photographing mode and in the camera shake correction mode below.

[1-1] Normal Photographing Mode

An operation of when the camera is set to the normal photographing mode will now be explained. When shutter button 21 is not pressed down, image data being photographed at certain intervals (e.g. 1/60 second) is written into image memory 5, and then converted into NTSC signals by NTSC encoder 6 and displayed at monitor 7. This will be called through-displaying below. When shutter button 21 is pressed down, photographing of a still image begins and image data photographed at that timing is written into image memory 5, displayed at monitor 7, encoded into a JPEG format by image compression circuit 8, and stored in memory card 9 as an image file.

[1-2] Camera Shake Correction Photographing Mode

The camera operation when adjusted to the camera shake correction photographing mode will now be explained. When the camera shake correction photographing mode is set, image data written into image memory 5 is transferred to camera shake correction circuit 30.

When shutter button 21 is not pressed down, image data being photographed at certain intervals (e.g. 1/60 second) is written into image memory 5, and then transferred to camera shake correction circuit 30. The image data that has been transferred to camera shake correction circuit 30 is transmitted to monitor 7 via NTSC encoder 6, as well as transmitted to brightness control circuit 31. The image data inputted to brightness control circuit 31 has its brightness level decreased by brightness control circuit 31 such that the brightness becomes similar to that of low-brightness images that are exposure-divided as will be described below, and then transmitted to movement detection circuit 32.

Movement detection circuit 32 calculates a movement vector between image data inputted immediately before the present input and the present image data, and determines whether the calculated movement vector is valid. This determination result of validity or invalidity is used in controlling divided exposures when shutter button 21 is pressed down. In addition, movement detection circuit 32 is controlled by microcomputer 10.

When shutter button 21 has been pressed down, microcomputer 10 instructs photographing control circuit 11 to divide an optimum exposure time into a plurality of times (e.g. 8 times) for serial photographing. The plurality of low-brightness image data thus division-exposed is respectively stored into image memory 5 and transferred to camera shake correction circuit 30 in series. In particular, the low-brightness image data is transmitted to movement detection circuit 32 and coordinate conversion circuit 33 within camera shake correction circuit 30.

Movement detection circuit 32 calculates a movement vector in series between a first low-brightness image data inputted first and each low-brightness image data inputted thereafter among the plurality of low-brightness image data that are division-exposed, and determines whether the calculated movement vector is valid in series.

When the movement vector is determined as valid, then each low-brightness image inputted from the second time and thereafter is coordinate-converted to the coordinates of the first low-brightness image by coordinate conversion circuit 33 based on the respective movement vectors relative to the first low-brightness image, such that deviation from the first low-brightness image disappears. Then each of the coordinate-converted low-brightness images are added to the image element values of the first low-brightness image or the image previously combined at image synthesis circuit 34 and stored in image memory 35. That is, positional deviations between the low-brightness images are corrected and an image that has been addition synthesized is stored in image memory 35.

When the exposure division number is set to N, each of the low-brightness images has its camera shake amount 1/N of the normal exposure because its exposure time is 1/N of the normal exposure time. Since the positional deviations between the low-brightness images are corrected and then the low-brightness images are addition synthesized, the camera shake amount of the synthesized image is decreased to 1/N of the normal exposure. The synthesized image is displayed at monitor 7 via NTSC encoder 6, as well as stored in memory card 9 via image compression circuit 8.

On the other hand, when a movement vector was determined as invalid, the low-brightness image is addition synthesized to the first low-brightness image or to the previously synthesized image at image synthesis circuit 34 without performing deviation correction at the coordinate conversion circuit.

[2] Explanation on Movement Detection Circuit 32

Movement detection circuit 32 detects a movement vector between a reference image and a present image in the camera shake correction mode, and determines whether the movement vector is valid or invalid. That is, movement detection circuit 32 performs "movement vector detection and validity determination process".

[2-1] General Explanation of a Movement Vector Detection Method

First, a method for detecting a movement vector between a reference image and a present image will be explained. When shutter button 21 is not pressed down, the reference image is an image inputted immediately before the present image, and the present image is an image currently inputted. When shutter button 21 is pressed down, the reference image is the first low-brightness image among a plurality of low-brightness images that have been division-exposed, and the present image is the second or later low-brightness image.

Figure 3:
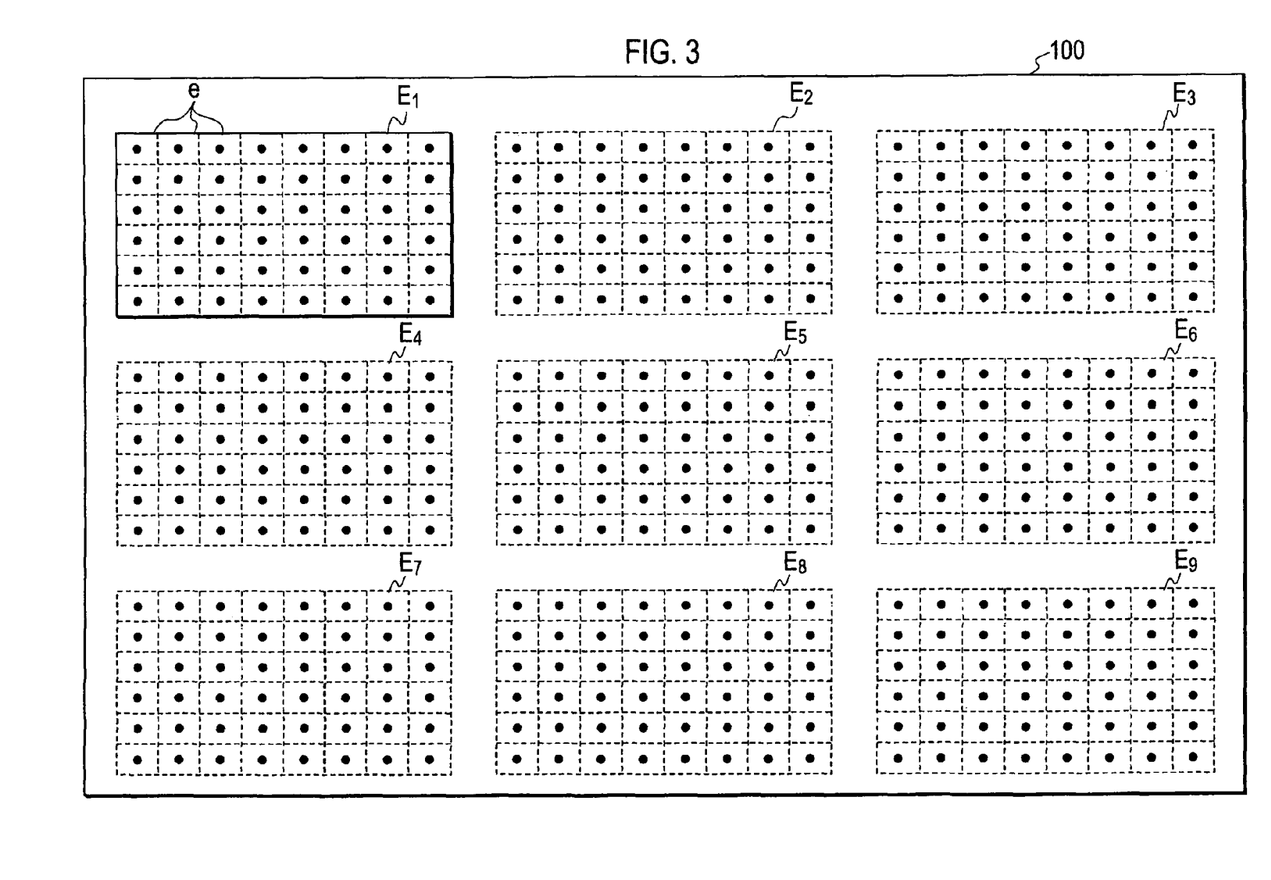
FIG. 3 is a schematic view showing a plurality of movement vector detection regions $E_1$ to $E_9$ that are set up within an image area.
Figure 4:
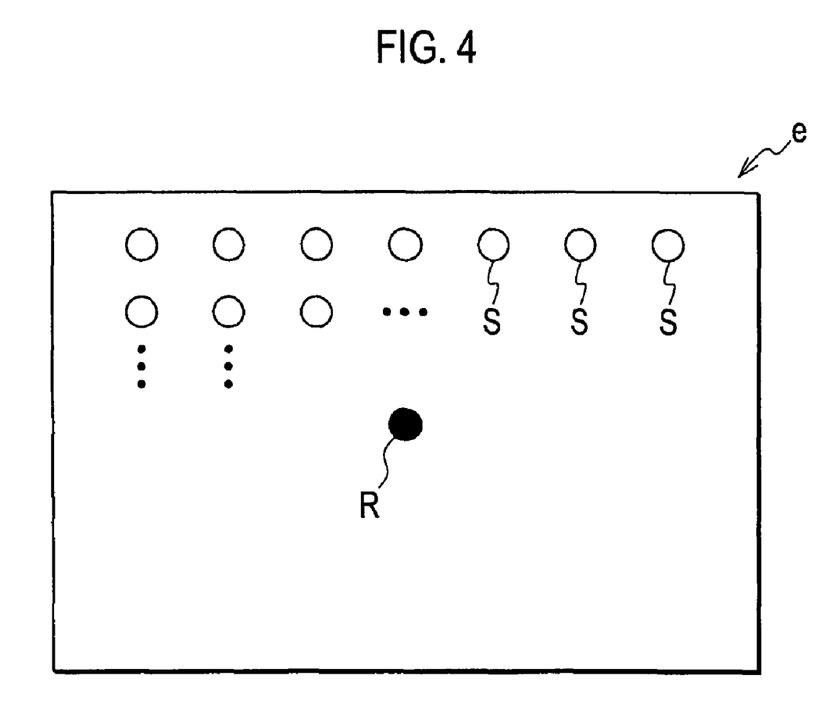
FIG. 4 is a schematic view showing a small region "e" within the movement vector detection region.

Movement detection circuit 32 calculates movement vectors etc. based on a representative point matching method. As shown in FIG. 3, a plurality of movement vector detection regions $E_1$ to $E_9$ are set up within an image area 100 of each frame. The size of each movement detection region $E_1$ to $E_9$ is the same. Also, each movement vector detection region $E_1$ to $E_9$ is divided into each small region e as shown in FIG. 3. In this example, each movement vector detection region $E_1$ to $E_9$ is divided into 48 small regions e. Each small region e has e.g. 32×32 pixels in size. As shown in FIG. 4, each small region e has a plurality of sampling points S and one representative point R.

The difference between an image signal level (brightness level) of each sampling point S within a small region e in the present image and an image signal level (brightness level) of a representative point R within a small region e in the reference image (i.e. a correlation value at each sampling point S) is calculated for each movement vector detection region $E_1$ to $E_9$. Then correlation values between sampling points having the same deflection from a representative point R for all the small regions e within a movement vector detection region are cumulatively added for each movement vector detection region $E_1$ to $E_9$. Therefore, cumulative correlation values having the number that corresponds to the number of sampling points S within a small region e for each movement vector detection region $E_1$ to $E_9$ are calculated. Then deflection of a point having the minimum cumulative correlation value (minimum value position Pmin of cumulative correlation value), that is, deflection having the highest correlativity, is extracted as a movement vector M of the movement vector detection regions $E_1$ to $E_9$.

In this example, the minimum value position Pmin of cumulative correlation value and minimum value Vmin of cumulative correlation value are calculated for each movement vector detection region $E_1$ to $E_9$, and average value Vave of cumulative correlation value is calculated for each movement vector detection region $E_1$ to $E_9$. Also, in this example, the number of positions having their cumulative correlation values of less than Vmin+a (a being set e.g. as 2), Nmin, that is, the number of positions having cumulative correlation values close to the minimum value, is calculated for each movement vector detection region $E_1$ to $E_9$.

[2-2] General Explanation of a Movement Vector Validity Determination Method

For each movement vector detection region $E_1$ to $E_9$, validity of the movement vector detected at the respective regions is determined, and based on the determination result, validity of the overall movement vector is determined. Further, based on the overall movement vector record, it is determined whether the camera is in a pan-tilt state. When the camera is found in the pan-tilt state, the overall movement vector is invalidated.

First, validity of a movement vector for each movement vector detection region $E_1$ to $E_9$ is determined as described below. That is, when the image contrast within a movement vector detection region is low, the movement vector of the movement vector detection region is invalidated. Also, even when the contrast of the image within a movement vector detection region is high, if multiple movements exist, such as from a moving object other than the camera shake within the movement vector detection region, a movement vector of the movement vector detection region is invalidated. Even when multiple movements do not exist within the movement vector detection region, if there are similar patterns within the movement vector detection region, a movement vector of the movement vector detection region is invalidated.

When the number of valid regions (movement vector detection regions that have been determined as valid) is zero, the overall movement vector is invalidated. When the number of valid regions (movement vector detection regions that have been determined as valid) is one or more, the overall movement vector is calculated using movement vectors of the valid regions. However, even when the number of valid regions is one or more, the overall movement vector is invalidated if the movement vector of each valid region does not have any similarities.

Next, based on the overall movement vector record, it is determined whether the camera is in a pan-tilt state. When one of the following conditions is met, it is determined that the camera has transited from a "camera shake state" to a "pan-tilt state":

(a1) the number of times the overall movement vector is continuously moving in the same horizontal or vertical direction being more than a predetermined value; or (a2) a numerical integration value of the overall movement vector that is continuously moving in the same horizontal or vertical direction being more than a predetermined proportion of the field angle.

Also, when one of the following conditions is met, it is determined that the camera has transited from the "pan-tilt state" to the "camera shake state":

(b1) the number of times that the overall movement vector has been continuously less than 0.5 pixel being more than 10 times; or (b2) the number of times that the overall movement vector has continuously moved in a direction opposite the direction of movement when the camera transited from the "camera shake state" to the "pan-tilt state" being more than 10 times.

Based on these criteria, it is determined whether the camera is in the pan-tilt state, and the overall movement vector is invalidated if it was determined that the camera is in the pan-tilt state. The reason that the overall movement vector is invalidated when the camera is determined to be in the pan-tilt state is because the amount of camera shake during the pan-tilt state is large and the amount of movement exceeds the detection range (small region e) of the representative point matching, thus making it difficult to perform an accurate movement vector detection.

[2-3] Explanation on "Movement Vector Detection and Validity Determination Process" Procedures Performed by Movement Detection Circuit 32

Figure 5:
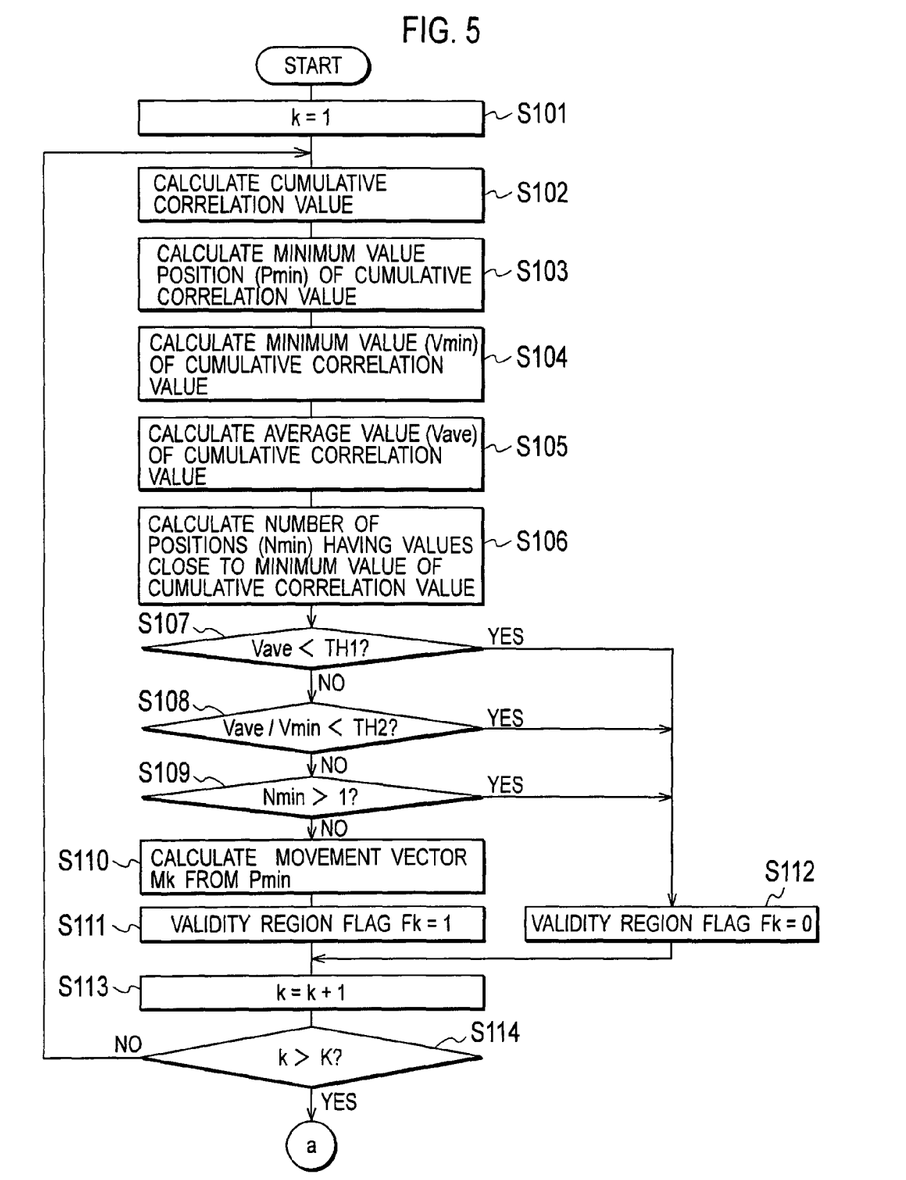
FIG. 5 is a flow chart showing a portion of a "movement vector detection and validity determination process" procedure performed by the movement detection circuit.
Figure 6:
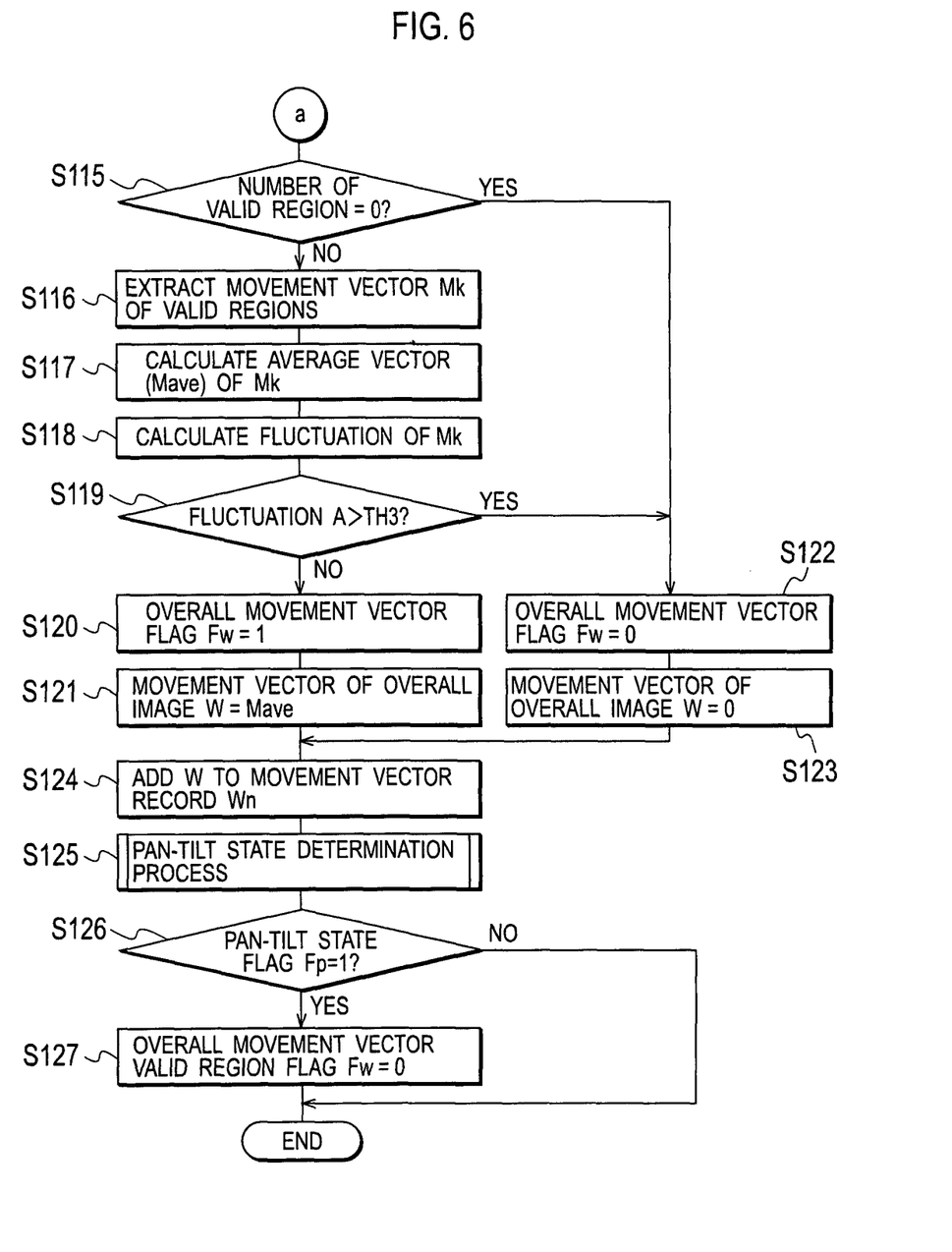
FIG. 6 is a flow chart showing a portion of a "movement vector detection and validity determination process" procedure performed by the movement detection circuit.

FIGS. 5 and 6 show the "movement vector detection and validity determination process" procedures performed by movement detection circuit 32. k is a variable that indicates one of movement vector detection region $E_1$ to $E_9$ and has a value of 1 to K. In this example, K=9. Also, Fk is a flag for indicating whether the movement vector detected at the movement vector detection region indicated by k is valid or invalid, with 1 being valid and 0 being invalid. Fw is a flag for indicating whether the overall movement vector is valid or invalid, with 1 being valid and 0 being invalid.

First, k=1 is set (step S101). The processes of steps S102 to S112 are performed for the movement vector detection region corresponding to k. That is, a cumulative correlation value for the movement vector detection region is calculated based on the above-described representative point matching method (step S102). As described above, the number of cumulative correlation values being obtained corresponds to the number of sampling points S within one small region e. Then the minimum value position Pmin of the cumulative correlation value, the minimum value Vmin of the cumulative correlation value, the average value Vave of the cumulative correlation value, and the number of positions having a value close to the minimum value Nmin of the cumulative correlation value are calculated (steps S103 to S106).

Next, in order to determine whether the image contrast within the movement vector detection region is low, it is determined whether the average value Vave of the cumulative correlation value is smaller than a threshold value TH1 (step S107). When Vave<TH1, it is determined that the contrast is low. This is because low contrast makes the difference of brightness low, which results in the low average value Vave of the cumulative correlation value. Here, threshold TH1 is determined empirically.

Because an accurate movement vector cannot be detected when the contrast is low, validity region flag Fk is made 0 when Vave<TH1 (step S112). Then, k is incremented by 1 (step S113), and it is determined whether k>K (step S114). If k=K, the process goes back to step S102. If k>K, the process moves to step S115.

In the above step S107, if it was determined that Vave=TH1, then it is determined whether the division value of the average value Vave of the cumulative correlation value being divided by the minimum value Vmin of the cumulative correlation value (Vave/Vmin) is smaller than threshold TH2, in order to determine whether a plurality of movements exist within the movement vector detection region (step S108).

When Vave/Vmin<TH2, it is determined that a plurality of movements exist within the movement vector detection region. This is based on the principle that when a plurality of movements exist, a complete matching position does not exist, and therefore the minimum value Vmin of the cumulative correlation value becomes large. Also, by dividing the average value Vave by the minimum value Vmin, it makes the determination not reliant on the contrast of the photographic subject. Threshold TH2 is also determined empirically.

Because an accurate movement vector cannot be detected when a plurality of movements exist, validity region flag Fk is made 0 when Vave/Vmin<TH2 (step S112). Then, k is incremented by 1 (step S113) and it is determined whether k>K (step S114). If k=K, the process goes back to step S102. If k>K, the process moves to step S115.

In the above step S108, if it was determined that Vave/Vmin=TH2, then it is determined whether there exist a plurality of positions Nmin having a value close to the minimum value of the cumulative correlation value, in order to determine whether there exist similar patterns within the movement vector detection region (step S109).

If there are a plurality of positions Nmin having a value close to the minimum value of the cumulative correlation value (Nmin>1), then it is determined that similar patterns exist within the movement vector detection region. Because reliability of the movement vector is low when there are similar patterns within the movement vector detection region, validity region flag Fk is made 0 if Nmin>1 (step S112). Then, k is incremented by 1 (step S113) and it is determined whether k>K (step S114). If k=K, the process goes back to step S102. If k>K, the process moves to step S115.

In the above step S109, if it was determined that Nmin=1, then movement vector Mk is calculated based on the minimum value position Pmin of the cumulative correlation value (step S110), and validity region flag Fk is made 1 (step S111). Then, k is incremented by 1 (step S113) and it is determined whether k>K (step S114). If k=K, the process goes back to step S102. If k>K, the process moves to step S115.

At step S115, it is determined whether the number of valid regions (movement vector detection regions determined as Fk=1) is 0 or not. If the number of the valid regions is more than one, movement vector Mk of the valid regions (movement vector detection regions determined as Fk=1) is extracted (step S116). Then average vector Mave of the extracted movement vectors Mk is calculated (step S117). Next, based on the following equation (1), fluctuation A of the movement vectors Mk among the valid regions is calculated (step S118).

$$A = [\text{Sum of } \{|Mk\text{-}Mave|/\text{Norm of } Mave\}]/\text{Number of valid regions} \qquad (1)$$

Then it is determined whether fluctuation A is larger than threshold TH3 (step S119). If fluctuation A is less than threshold TH3 (A=TH3), then overall movement vector validity flag Fw is made 1 (step S120), and movement vector of the overall image (overall movement vector) W is set to be average vector Mave calculated by step S117 (step S121). Then the process moves to step S124.

At the above step S115, if the number of valid regions was determined as 0, or if fluctuation A is determined as larger than threshold TH3 at the above step S119, then overall movement vector validity flag Fw is made 0 (step S122), and movement vector of the overall image (overall movement vector) W is set to be 0 (step S123). Then the process moves to step S124.

At step S124, the above obtained overall movement vector W is added to movement vector record Wn. Next, from the movement vector record Wn, it is determined whether the camera is in a pan-tilt state (pan-tilt state determination process) (step S125). The pan-tilt state determination process will be described in detail below.

Once the pan-tilt state determination process is finished, it is determined whether pan-tilt state flag Fp for indicating whether the camera is in the pan-tilt state is 1 (step S126). Pan-tilt state flag Fp is made 1 if it was determined that the camera is in the pan-tilt state by the pan-tilt state determination process, and pan-tilt state flag Fp is made 0 if it was determined that the camera is not in the pan-tilt state.

If Fp=1, overall movement vector validity flag Fw is made 0 (step S127), and then this time's "movement vector detection and validity determination process" is finished. If it was determined that Fp=0, then this time's "movement vector detection and validity determination process" is finished. In this case, final value for overall movement vector validity flag Fw is the value established at the above step S120 or the above step S122.

Figure 7:
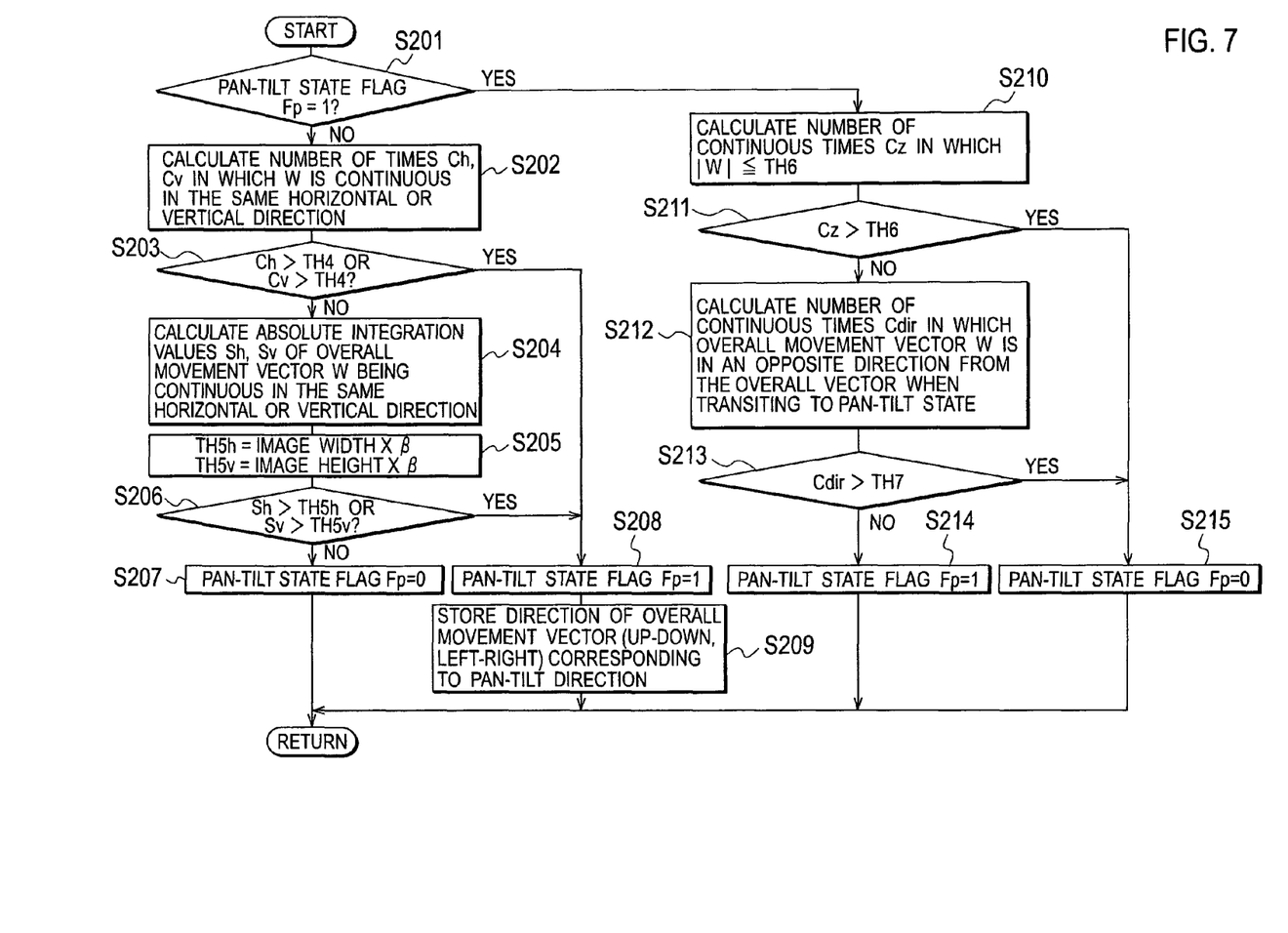
FIG. 7 is a flow chart showing a detailed procedure by step S125 of FIG. 6 (pan-tilt state determination process).

FIG. 7 shows a detailed procedure of step S125 (pan-tilt state determination process) of FIG. 6. First, it is determined whether pan-tilt state flag Fp=1 (step S201). Pan-tilt state flag Fp is set up as 0 as a default setting at the time of system start-up.

If pan-tilt state flag Fp is 0, that is, when it was determined at the previous time that the camera is not in a pan-tilt state (i.e. being in the camera shake state), it is determined whether one of the above criteria (a1) and (a2) is met, and if one of the above criteria (a1) and (a2) is met, it is determined that the state has transited from the "camera shake state" to the "pan-tilt state". If neither of the above criteria (a1) or (a2) is met, it is determined that the "camera shake state" continues.

That is, if it was determined at the above step S201 that Fp=0, the number of times Ch, Cv overall movement vector W is continuously moving in the same horizontal or vertical direction is calculated based on movement vector record Wn (step S202). The number of continuous movement Ch, Cv is calculated in the direction that goes back from the present to the past. Ch indicates a number of continuous movement when overall movement vector W is continuous in the horizontal direction, and Cv indicates a number of continuous movement when overall movement vector W is continuous in the vertical direction. Then it is determined whether either one of the criteria Ch>TH4 and Cv>TH4 is met (step S203). If either one of the criteria Ch>TH4 and Cv>TH4 is met, the state is determined to have transited from the "camera shake state" to the "pan-tilt state" and pan-tilt state flag Fp is made 1 (step S208). In addition, the direction of the overall movement vector corresponding to the pan-tilt direction (up-down and left-right) is stored (step S209) and then the process moves to step S126 of FIG. 6.

At the above step S203, if it was determined that neither one of the criteria Ch>TH4 or Cv>TH4 is met, absolute values Sh, Sv of overall movement vector w having been continuous in the same horizontal or vertical direction thus far are calculated (step S204). Sh indicates an absolute value of when overall movement vector W is continuous in the horizontal direction, and Sv indicates an absolute value of when overall movement vector W is continuous in the vertical direction.

Next, based on the following equation (2), threshold TH5$h$ and threshold TH5$v$ are calculated (step S205):

$$TH5h = \text{image width} \times \beta$$

$$TH5v = \text{image height} \times \beta \quad (2)$$

Here, $\beta$ is a predetermined constant number, e.g. being set as 0.3.

Then it is determined whether either one of the criteria Sh>TH5$h$ and Sv>TH5$v$ is met (step S206). If either one of the criteria Sh>TH5$h$ and Sv>TH5$v$ is met, then the state is determined as having transited from the "camera shake state" to the "pan-tilt state" and pan-tilt state flag Fp is made 1 (step S208). In addition, the direction of the overall movement vector corresponding to the pan-tilt direction (up-down and left-right) is stored (step S209) and then the process moves to step S126 of FIG. 6.

At the above step S206, if it was determined that neither one of the criteria Sh>TH5$h$ and Sv>TH5$v$ is met, then the pan-tilt state flag Fp is made 0 (step S207). Then the process moves to step S126 of FIG. 6.

At the above step S206, if pan-tilt state flag Fp is determined as 1, that is, when it was determined at the previous time that the camera is in the pan-tilt state, it is determined whether one of the above criteria (b1) and (b2) is met, and if one of the above criteria (b1) and (b2) is met, it is determined that the state has transited from the "pan-tilt state" to the "camera shake state". If neither of the above criteria (b1) or (b2) is met, it is determined that the "pan-tilt state" continues.

That is, if it was determined at the above step S201 that Fp=1, the number of times Cz in which the absolute value |W| of overall movement vector W is continuously less than threshold TH6 is calculated (step S210). The number of continuous times Cz is calculated in the direction that goes back from the present to the past. Therefore, if the calculated absolute value |W| of overall movement vector W at this time is larger than threshold TH6, then the number of continuous times Cz is 0.

It is now determined whether the number of continuous times Cz calculated at step S210 is larger than threshold TH6 (step S211). If Cz>TH6, it is determined that the state has transited from the "pan-tilt state" to the "camera shake state" and pan-tilt state flag Fp is made 0 (step S215). Then, the process moves to step S126 of FIG. 6.

The direction of the overall movement vector corresponding to the direction of pan-tilt (up-down and left-right) at the time when the camera transited from the "camera shake state" to the "pan-tilt state" in the most recent past will now be called a "direction of overall vector at the time of transition to the pan-tilt state". This direction is stored at the above-described step S209.

At the above step S211, if it was determined that Cz=TH6, then the number of continuous times Cdir in which the overall movement vector is in the direction opposite the "direction of overall vector at the time of transition to the pan-tilt state" is calculated (step S212). The overall movement vector W in the direction opposite the "direction of overall vector at the time of transition to the pan-tilt state" means the overall movement vector W having a component in the direction opposite the "direction of overall vector at the time of transition to the pan-tilt state". Also, Cdir is calculated in the direction that goes back from the present to the past.

Now it is determined whether the number of continuous times Cdir calculated at step S212 is larger than threshold TH7 (step S213). If Cdir>TH7, then it is determined that the state has transited from the "pan-tilt state" to the "camera shake state" and pan-tilt state flag Fp is made 0 (step S215). Then, the process moves to step S126 of FIG. 6.

At the above step S213, if it was determined that Cdir=TH7, then it is determined that the "pan-tilt state" continues and pan-tilt state flag Fp is made 1 (step S214). Then, the process moves to step S126 of FIG. 6.

[3] Explanation on Overall Digital Camera Operation

Figure 8:
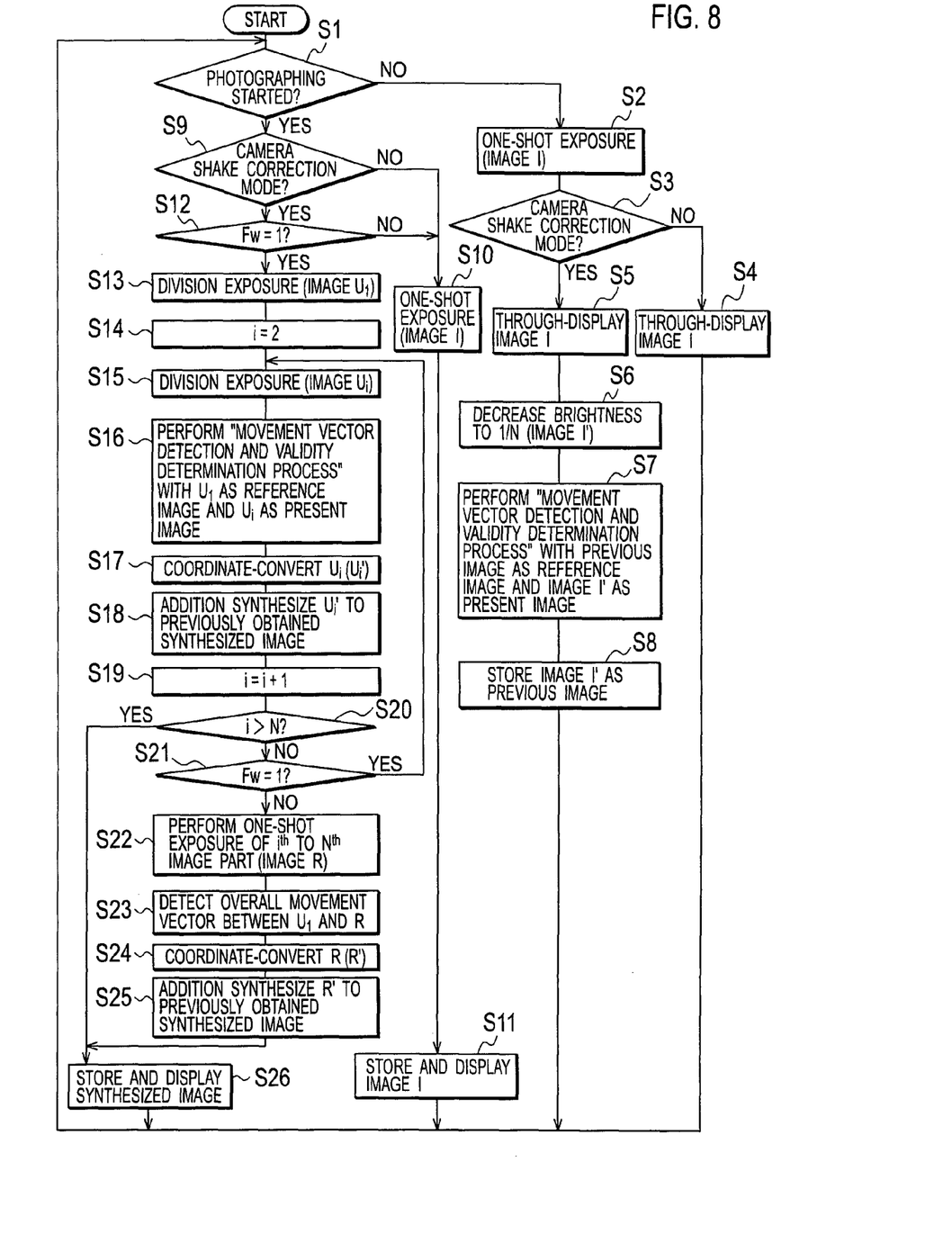
FIG. 8 is a flow chart showing an overall operation of the digital camera.

FIG. 8 shows an overall operation of the digital camera. First, it is determined whether a still image photographing has been started (step S1). That is, it is determined whether shutter button 21 has been pressed down. If the still image photographing has not been started, an image I is obtained by a one-shot exposure (step S2). Then, it is determined whether the camera shake correction mode is specified (step S3). If the camera shake correction mode is not specified, obtained image I is through-displayed (step S4). Then the process goes back to step S1.

At the above step S3, if the camera shake correction mode is specified, obtained image I is through-displayed (step S5)

and also the brightness of obtained image I is decreased to 1/N (N being the number of divided exposures) (step S6). The image that has its brightness decreased to 1/N will be indicated as image I' below. Then the "movement vector detection and validity determination process" that has been explained in reference to FIGS. 5 to 7 above is performed by movement detection circuit 32, with the previous image (the image that was obtained at step S6 the previous time and that is stored as the previous image at step S7 as described below) being a reference image, and with the image I' obtained at step S6 this time being a present image (step S7). After this, the image I' obtained at the above step S6 is stored as a previous image (step S8) and then the process goes back to step S1.

At the above step S1, if it was determined that the still image photographing has started, whether the camera shake correction mode is specified is determined (step S9). If the camera shake correction mode is not specified, image I is obtained by a one-shot exposure (step S10). The obtained image I is stored in memory card 9 after being compressed by image compression circuit 8, and the obtained image I is displayed at monitor 7 (step S11). Then the process goes back to step S1.

At the above step S9, if it was determined that the camera shake correction mode is specified, then whether overall movement vector flag Fw is 1 (step S12). That is, based on the validity determination result of the "movement vector detection and validity determination process" performed at the above-described step S7 right before the start of the still image photographing, whether Fw=1 is determined.

If Fw=0, then image I is obtained by a one-shot exposure (step S10). The obtained image I is stored in memory card 9 after being compressed by image compression circuit 8, and the obtained image I is displayed at monitor 7 (step S11). Then the process goes back to step S1. That is, even when still image photographing has been started with the camera shake correction mode being specified, the still image is photographed by a one-shot exposure, not by divided exposures, by predicting that alignment of a plurality of low-brightness images obtained at the divided exposures will fail if it was determined that the overall movement vector is invalid at the time of through-display right before photographing.

At the above step S12, if it was determined that Fw=1, a first low-brightness image $U_1$ is obtained and stored by performing divided exposures (step S13). Next, variable i for storing the number of times of divided exposures is specified as 2 (step S14), and then the $i^{th}$ low-brightness image $U_i$ is obtained by performing divided exposures (step S15). Then the "movement vector detection and validity determination process" that has been explained in relation to FIGS. 5 to 7 is performed, with the first low-brightness image $U_1$, being a reference image, and with the $i^{th}$ low-brightness image $U_i$ obtained at the above step S15 being a present image (step S16).

Next, the low-brightness image $U_i$ has its coordinates converted based on the overall movement vector detected at the above step S16 in order to align the $i^{th}$ low-brightness image $U_i$ obtained at the above step S15 to the first low-brightness image $U_1$ (step S17). The coordinate-converted low-brightness image $U_i'$ is then addition synthesized to the "previously obtained synthesized image" (step S18). If the low-brightness image $U_i'$ is an image that the second low-brightness image $U_i$ is coordinate-converted, then the "previously obtained synthesized image" is the first low-brightness image $U_1$, and if the low-brightness image $U_i'$ is an image that the third or later low-brightness image $U_i$ is coordinate-converted, then the "previously obtained synthesized image" is the synthesized image obtained at the previous step S18.

Next, i is incremented by 1 (step S19). Then whether 1>N (N being the number of divided exposures) is determined (step S20). If i=N, it is determined whether overall movement vector flag Fw is 1 (step S21). That is, whether Fx=1 is determined based on the validity determination result at the "movement vector detection and validity determination process" performed by the above step S16. If Fw=1, the process goes back to step S15 and the processes of steps S15 to S20 are performed.

If it was determined that 1>N at the above step S20, then it is judged that the divided exposures was performed N times, and the synthesized image obtained at step S18 is stored in memory card 9 after being compressed by image compression circuit 8 and the obtained image I is displayed at monitor 7 (step S26). Then the process goes back to step S1.

At the above step S21, if it was determined that Fw=0, then image R is obtained by performing a one-shot exposure on the part from the $i^{th}$ to Nth times (i.e. performing a one-shot exposure on the remaining part) (step S22). Then an overall movement vector between the first low-brightness image $U_1$ and image R obtained at the above step S22 is detected by movement detection circuit 32 (step S23).

Next, image R has its coordinates converted based on the overall movement vector detected at the above step S23 in order to align image R obtained at the above step S22 to the first low-brightness image $U_1$ (step S24). The coordinate-converted image $R_i'$ is addition synthesized to the synthesized image obtained at the above step S18 (step S25). Then, the synthesized image obtained at step S25 is stored in memory card 9 after being compressed by image compression circuit 8 and the obtained image I is displayed at monitor 7 (step S26). Then the process goes back to step S1.

In the above embodiment, even when a still image photographing is started with the camera shake correction mode being specified, the still image photographing is performed by a one-shot exposure, not divided exposures, if the overall movement vector is determined to be invalid at the through-display right before photographing. Therefore, increase of the amount of camera shake or blurring of photographic subject due to the alignment failure can be prevented.

Moreover, as shown in steps S21 to S25 in the above embodiment, even during the divided exposures, if it was determined that the overall movement vector is invalid, the remaining part is photographed by a one-shot exposure and synthesized to the previously synthesized image. Thus, increase of the amount of camera shake or blurring of photographic subject due to the alignment failure can be prevented.

Although the process moved to step S21 when it was determined that i=N at the above step S20 in the above embodiment, the process can instead be moved to step S15. In this case, the processes of steps S21 to S25 become unnecessary. In this way, if the overall movement vector was determined as invalid during the divided exposures, the positional deviation correction by the coordinate conversion circuit is not performed and the presently-obtained low-brightness image is addition synthesized to the already obtained synthesized image.

According to the embodiment, a photographing mode can be automatically switched according to a predicted result by predicting whether alignment of a plurality of images obtained by a still image photographing mode based on divided exposures is normally performed before the still image photographing is started, in an imaging device having a still image photographing mode based on the one-shot exposure and a still image photographing mode based on the divided image exposures.

Moreover, according to the embodiment, it is predicted whether alignment of the remaining images is normally performed during a still image photographing based on divided exposures, and then it can be determined whether to continue the divided exposures or to perform the one-shot exposure on the remaining part according to the predicted result.

The invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims are therefore intended to be embraced therein.

What is claimed is:

1. An imaging device, comprising:
    a first still image photographing unit that obtains a still image by one exposure;
    a second still image photographing unit that generates a still image by dividing an exposure length a plurality of times to obtain a plurality of low brightness images, and aligning and combining the obtained plurality of low brightness images;
    a first movement computation unit that calculates image movement from input images when still image photographing is not performed; and
    a photographing mode switching unit that switches between the first still image photographing unit and the second still image photographing unit when commencing still image photographing, from information of the calculated image movement prior to making a still image photograph.

2. The imaging device of claim 1, wherein the first movement computation unit comprises a brightness reducing unit that reduces brightness from the number of divided exposures divided at the second still image photographing unit prior to making a still image photograph, and a computation unit that calculates image movement from input images of reduced brightness.

3. The imaging device of claim 1, wherein the second still image photographing unit comprises:
    a second movement computation unit that calculates information of image movement between obtained second or later low brightness image and the first low-brightness image when obtaining the second or later low-brightness image;
    a judgment unit that determines whether to continue divided exposures or to perform a one-shot exposure of the remaining low-brightness images from information of image movement calculated by the second movement computation unit;
    an image unit that obtains an image that corresponds to the remaining low-brightness images by performing the one-shot exposure of the remaining low-brightness images if a one-shot exposure of the remaining low-brightness images is selected; and
    an image synthesis unit that generates one still image by aligning and combining the obtained image that corresponds to the remaining low-brightness images to the previously combined image.

4. The imaging device of claim 3, wherein the judgment unit determines whether to continue divided exposures or to perform a one-shot exposure of the remaining low-brightness images based on a determination of low image contrast, from information of image movement calculated by the second movement computation unit.

5. The imaging device of claim 3, wherein the judgment unit determines whether to continue divided exposures or to perform a one-shot exposure of the remaining low-brightness images from a determination of whether several kinds of movement exist within an image, from image movement information calculated by the second movement computation unit.

6. The imaging device of claim 3, wherein the judgment unit determines whether to continue divided exposures or to perform a one-shot exposure of the remaining low-brightness images from a determination of whether a similar pattern exists within an image, from image movement information calculated by the second movement computation unit.

7. The imaging device of claim 3, wherein the judgment unit determines whether to continue divided exposures or to perform a one-shot exposure of the remaining low-brightness images from a determination of whether an image is in a pan-tilt state, from information of image movement calculated by the second movement computation unit.

8. The imaging device of claim 1, wherein the photographing mode switching unit switches between the photographing mode of the first still image photographing unit and the photographing mode of the second still image photographing unit from a determination of whether image contrast is low, based on information of image movement calculated by the first movement computation unit.

9. The imaging device of claim 1, wherein the photographing mode switching unit switches between the photographing mode of the first still image photographing unit and the photographing mode of the second still image photographing unit, from a determination of whether several kinds of movements exist within an image, based on information of image movement calculated by the first movement computation unit.

10. The imaging device of claim 1, wherein the photographing mode switching unit switches between the photographing mode of the first still image photographing unit and the photographing mode of the second still image photographing unit from a determination of whether similar patterns exist within an image, based on information of image movement calculated by the first movement computation unit.

11. The imaging device of claim 1, wherein the photographing mode switching unit switches between the photographing mode of the first still image photographing unit and the photographing mode of the second still image photographing unit from a determination of whether an image is in a pan-tilt state, from information of image movement calculated by the first movement computation unit.

12. An imaging device, comprising:
    a still image photographing unit that generates a still image by dividing an exposure length to obtain a plurality of low-brightness images, and aligning and combining the obtained low-brightness images,
    wherein the still image photographing unit includes:
        a movement computation unit that calculates image movement between an obtained second or later low-brightness image and the first low-brightness image when obtaining the second or later low-brightness image;
        a judgment unit that determines whether to continue the divided exposures or to perform a one-shot exposure of the remaining low-brightness images from information of image movement calculated by the movement information computation unit;
        an image obtaining unit that obtains an image corresponding to the remaining low-brightness images by performing the one-shot exposure of the remaining low-brightness images if the one-shot exposure of the remaining low-brightness images is selected; and an image synthesis unit that generates a still image by aligning and combining an obtained image that corresponds to the remaining low-brightness images to the previously combined image.

13. The imaging device of claim 12, wherein the judgment unit determines whether to continue divided exposures or to perform the one-shot exposure of the remaining low-brightness images from a determination of whether an image contrast is low, based on information of image movement calculated by the movement computation unit.

14. The imaging device of claim 12, wherein the judgment unit determines whether to continue divided exposures or to perform the one-shot exposure of the remaining low-brightness images from a determination of whether several kinds of movements exist within an image, based on the information regarding image movement calculated by the movement information computation unit.

15. The imaging device of claim 12, wherein the judgment unit determines whether to continue divided exposures or to perform the one-shot exposure of the remaining low-brightness images from a determination of whether similar patterns exist within an image, based on the information regarding image movement calculated by the movement information computation unit.

16. The imaging device of claim 12, wherein the judgment unit determines whether to continue divided exposures or to perform the one-shot exposure of the remaining low-brightness images from a determination of whether an image is in a pan-tilt state, based on information of image movement calculated by the movement information computation unit.

* * * * *